United States Patent
Stancu et al.

(10) Patent No.: US 7,100,717 B2
(45) Date of Patent: Sep. 5, 2006

(54) INTEGRATED ELECTRIC POWER TAKE-OFF SYSTEM

(75) Inventors: Constantin Stancu, Anaheim, CA (US); James M. Nagashima, Cerritos, CA (US); Simon H. Mc Cullough, Greensburg, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/285,169

(22) Filed: Oct. 31, 2002

(65) Prior Publication Data

US 2004/0084229 A1     May 6, 2004

(51) Int. Cl.
*H02P 27/05* (2006.01)

(52) U.S. Cl. ............... 180/65.1; 318/722; 318/801
(58) Field of Classification Search ............ 180/65.1, 180/65.2, 65.3, 65.4, 65.8; 318/801, 722
See application file for complete search history.

(56) References Cited

U.S. PATENT DOCUMENTS

| | | | | |
|---|---|---|---|---|
| 5,099,186 A | * | 3/1992 | Rippel et al. ............... 318/803 |
| 5,581,171 A | * | 12/1996 | Kerfoot et al. ............. 320/137 |
| 5,642,270 A | * | 6/1997 | Green et al. .................. 363/17 |
| 5,710,699 A | * | 1/1998 | King et al. .................. 363/132 |
| 6,148,784 A | * | 11/2000 | Masberg et al. ......... 123/192.1 |
| 6,262,896 B1 | * | 7/2001 | Stancu et al. .................. 363/17 |
| 6,281,660 B1 | * | 8/2001 | Abe ............................ 320/103 |
| 6,392,854 B1 | * | 5/2002 | O'Gorman .................... 361/31 |
| 6,459,175 B1 | * | 10/2002 | Potega ........................ 307/149 |
| 6,476,571 B1 | * | 11/2002 | Sasaki ........................ 318/139 |
| 6,647,325 B1 | * | 11/2003 | Shimazaki et al. ........... 701/22 |
| 6,696,820 B1 | * | 2/2004 | Peter ............................ 322/24 |
| 6,755,267 B1 | * | 6/2004 | Yamada et al. ............ 180/65.8 |
| 6,812,586 B1 | * | 11/2004 | Wacknov et al. ............. 290/52 |
| 2004/0100221 A1 | * | 5/2004 | Fu .............................. 318/700 |
| 2004/0251881 A1 | * | 12/2004 | Haydock et al. .............. 322/24 |

\* cited by examiner

*Primary Examiner*—Jeff Restifo
(74) *Attorney, Agent, or Firm*—Christopher Devries

(57) ABSTRACT

The preferred embodiments of the present invention utilize the internal combustion engine of a hybrid vehicle, coupled with an energy storage device and series of inverters to provide electrical power generation capability for an electric power take-off (EPTO) system. Additional embodiments of the present invention utilize an existing on-board AC induction motor to provide filtering capability for the generated AC power.

11 Claims, 6 Drawing Sheets

INTEGRATED ELECTRIC POWER TAKE-OFF SYSTEM

TECHNICAL FIELD

The present invention generally relates to vehicle on-board power generation, and more particularly relates to electric power take-off (EPTO) systems for hybrid electric vehicles.

BACKGROUND OF THE INVENTION

Traditional combustion engine power plants in cars can also be used to provide nominal amounts of alternating current (AC) electrical power through the use of an inverter circuit. In the most typical applications, the AC electrical power generated by standard combustion engines is utilized to sustain the electrical needs of the car and its accessories. This generation capability has additionally led to the widespread deployment of "convenience outlets," which are now used to power computers, video games, cell phones, and the like.

While generation of AC electrical power is possible, it is difficult to obtain significant amounts of useful electrical power from standard combustion engines because the combustion engine exhibits relatively low conversion efficiency. Additionally, since most combustion engines require significant cooling during operation, extended operation of the engine to generate electricity will require the type of airflow usually generated during vehicle locomotion. Finally, environmental considerations such as air emissions and engine noise make automobiles with traditional combustion engines poor candidates for any meaningful levels of power generation, particularly to power the types of electrical loads not directly associated with the vehicle.

Certain new types of vehicles, known as hybrid vehicles, employ a combustion engine coupled with a combination electric motor-generator in order to provide vehicle locomotion. In some of these hybrid or mild-hybrid powertrain systems, an electric motor-generator system replaces the conventional starter motor and alternator. When the hybrid vehicle is decelerating or is stopped, the fuel flow to the engine is shut off, thereby improving fuel economy. The motor-generator system of the hybrid vehicle is implemented to enable this fuel cutoff feature while minimally affecting drivability. As with the conventional combustion engine, the power plant in hybrid vehicles can also be used to provide AC power for convenience outlets and other electrical requirements associated with the hybrid vehicle. However, as with traditional combustion engines, the present AC power generating capabilities of hybrid vehicles are limited in both scope and application.

In view of the foregoing, it should be appreciated that it would be desirable to provide methods for adapting the on-board components of a hybrid vehicle to generate electrical power for use in applications not directly related to the operation of the hybrid vehicle, i.e., off-vehicle loads. It is also desirable to provide electrical power for both balanced and unbalanced loads, as well as support for three-phase and single-phase voltages. Furthermore, additional desirable features will become apparent to one skilled in the art from the foregoing background of the invention and following detailed description of a preferred exemplary embodiment and appended claims.

SUMMARY OF THE INVENTION

The preferred embodiments of the present invention utilize the internal combustion engine of a hybrid vehicle, coupled with an energy storage device and a series of inverters to provide electrical power generation capability for an electric power take-off (EPTO) system. Addition embodiments of the present invention utilize an existing on-board AC induction motor to provide filtering capability for the generated AC power.

BRIEF DESCRIPTION OF THE DRAWINGS

The present invention will hereinafter be described in conjunction with the appended drawing figures, wherein like numerals denote like elements, and.

DESCRIPTION OF THE PREFERRED EMBODIMENT

The following detailed description of a preferred exemplary embodiment of the invention is mainly exemplary in nature and is not intended to limit the invention or the application or use of the invention.

The most preferred exemplary embodiments of the present invention are described in conjunction with an Allison Transmission EV-Drive system, as provided by Allison Transmission of Indianapolis, Ind. However, it should be noted that the possible embodiments of the present invention are not limited in application to a specific transmission or to any specific electrical machines. Specifically, the present invention is capable of being used in conjunction with any transmission that employs two electrical machines with their corresponding electronics converters. Similarly, although illustrated in conjunction with induction motors, other suitable electrical machines known to those skilled in the art may be substituted.

Figure 1:
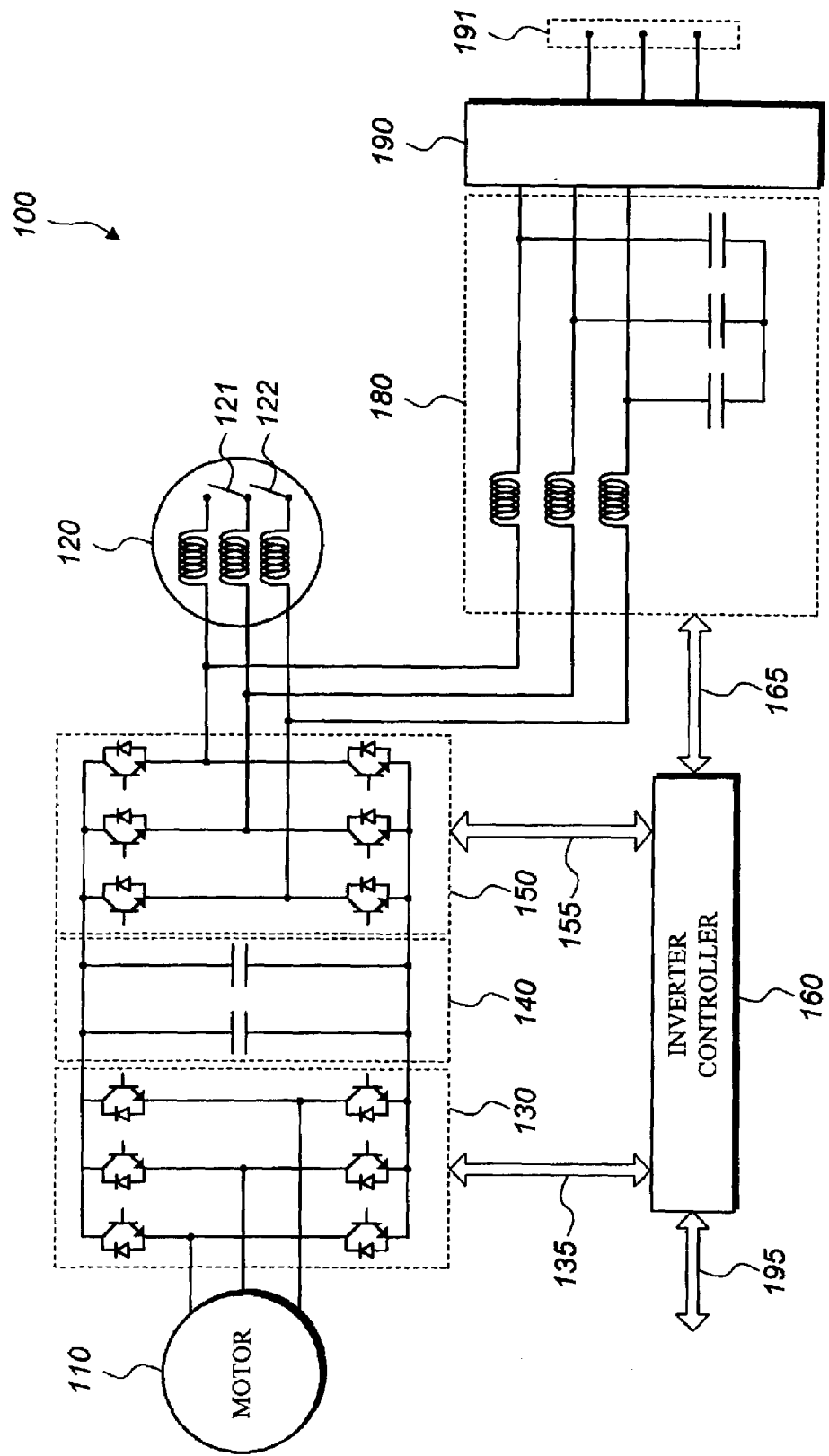
FIG. 1 is a schematic circuit diagram depicting an EPTO system for a three-phase balanced load or two unbalanced single-phase loads in accordance with a preferred exemplary embodiment of the present invention.

Referring now to FIG. 1, an EPTO system 100 for powering a three-phase balanced load or two unbalanced single-phase loads in accordance with a preferred exemplary embodiment of the present invention comprises: a first AC induction motor 110; a second AC induction motor 120; a first power inverter 130; a second power inverter 150; an energy storage device 140; an inverter controller 160; a power filter 180; and a power distribution/protection mechanism 190. Vehicle/transmission control bus 195, first inverter controller bus 135, second inverter controller bus 155, and filter bus 165 provide communication paths between the various components. Additionally, output terminals 191 are distribution points for the power output from EPTO system 100. In FIG. 1, as in all FIGs., it should be noted that the depicted connections are merely representative in nature and the actual physical connection between the various components may be accomplished in many different ways.

First AC induction motor 110 and second AC induction motor 120 are mechanically inter-connected through a complex planetary gear set (not shown this FIG.) and electrically coupled or connected through first power inverter 130 and second power inverter 150. Energy storage device 140 is typically connected in parallel with first power inverter 130 and second power inverter 150. Energy storage device 140 is any suitable type of energy storage device known to those skilled in the art such as one or more battery packs and/or ultra-capacitors.

First AC induction motor 110 is typically connected to an internal combustion engine prime mover (not shown this FIG.). In operation, first AC induction motor 110 acts as a generator, transforming the mechanical energy received at its input shaft, which is physically coupled to the ICE, into AC electrical energy. First power inverter 130 is electrically connected to the output of first AC induction motor 110 and operates as a boost rectifier. This allows first power inverter 130 to transform the AC electrical energy into DC electrical energy that is then stored in energy storage device 140.

Second AC induction motor 120 comprises a plurality of internal windings that are interconnected by switches 121 and 122. Switches 121 and 122 are typically located on the input terminals or the neutral connection, as shown in FIG. 1. Additionally, second AC induction motor 120 is typically connected to the wheels of the hybrid vehicle (not shown this FIG.) containing EPTO system 100. Since second AC induction motor 120 is not needed for operation of EPTO system 100, it is disconnected by opening switches 121 and 122.

Second power inverter 150 is operated as an inverter, transforming DC power into AC power at a fixed frequency and voltage. The three-phase output of second power inverter 150 is filtered by power filter 180 and is then delivered to output terminals 191 through power distribution/protection mechanism 190. In this example, output terminals 195 provide, but are not limited to, 208V 60 Hz three-phase power and can be used to supply power for a three-phase balanced load or two unbalanced single-phase loads.

Power filter 180 is a series of inductors and capacitors that serve to filter and smooth the AC electrical power signal delivered by second power inverter 150. Power distribution/protection mechanism 190 provides circuit protection features and also provides for the physical distribution of the AC electrical power to an external load. Although shown as discrete components, those skilled in the art will appreciate that power filter 180 and power distribution/protection mechanism 190 may be combined into a single device.

Inverter controller 160 is connected to first power inverter 130 by first inverter controller bus 135 and to second power inverter 150 by second inverter controller bus 155. Inverter controller 160 is connected to power filter 180 and power distribution/protection mechanism 190 via filter bus 165. Inverter controller 160 is used to control the operation of first power inverter 130 and second power inverter 150 during EPTO operation. Additionally, inverter controller 160 accepts feedback from power filter 180 and power distribution/protection mechanism 190 relative to voltage and operational conditions. Finally, inverter controller 160 also communicates with the vehicle/transmission controller via bus 195 to coordinate total system management, including ICE speed control and fault handling functions.

Figure 2:
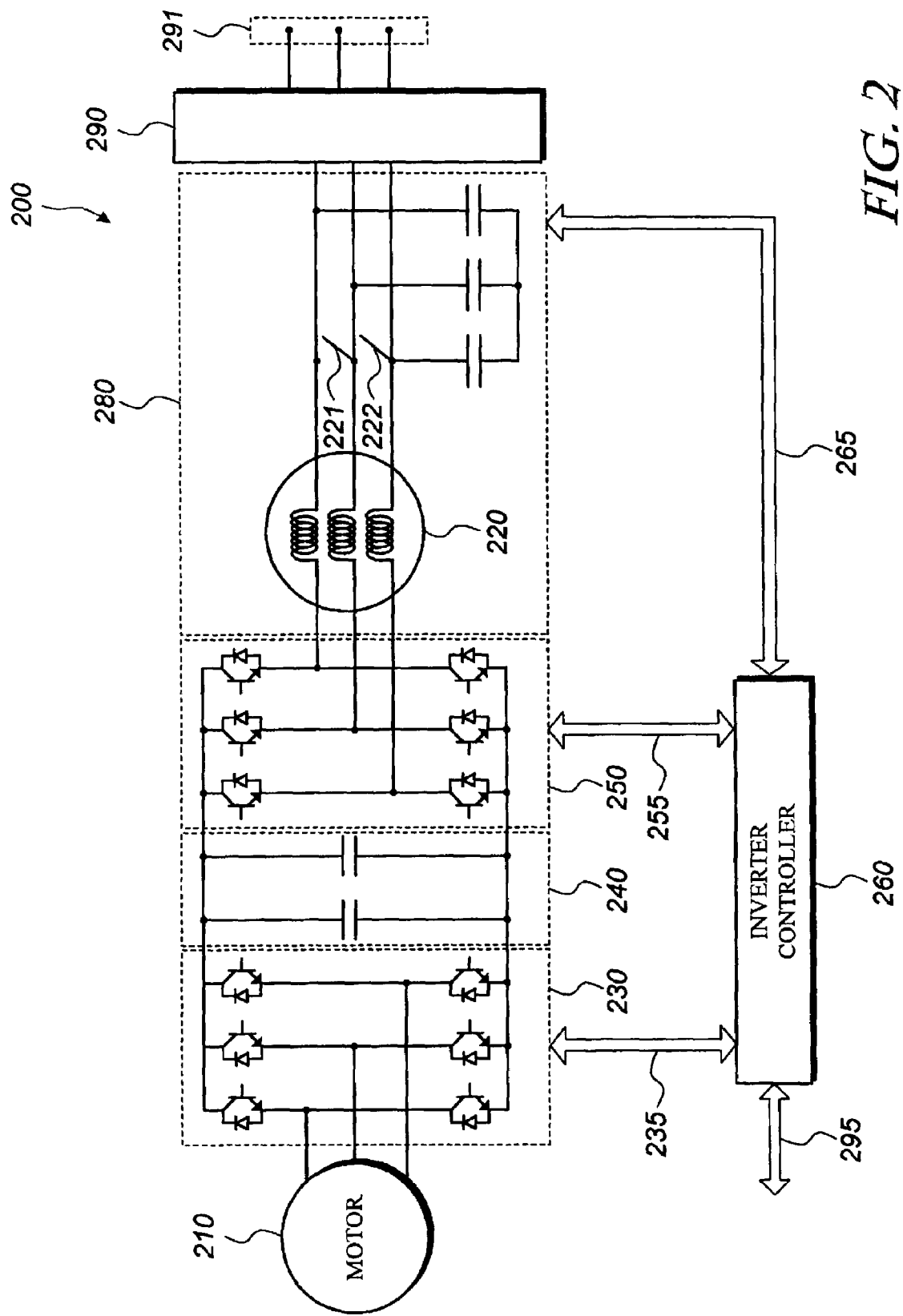
FIG. 2 is a schematic circuit diagram depicting an EPTO system for three-phase balanced loads in accordance with an alternative preferred exemplary embodiment of the present invention.

Referring now to FIG. 2, an EPTO 200 system for powering three-phase balanced loads in accordance with an alternative preferred exemplary embodiment of the present invention comprises: a first AC induction motor 210; a second AC induction motor 220; a first power inverter 230; a second power inverter 250; an energy storage device 240; an inverter controller 260; a power filter 280; and a power distribution/protection mechanism 290. Vehicle/transmission control bus 295, first inverter controller bus 235, second inverter controller bus 255, and filter bus 265 provide communication paths between the various components. Additionally, output terminals 291 are distribution points for the power output from EPTO system 200.

First AC induction motor 210 and second AC induction motor 220 are mechanically inter-connected through a complex planetary gear set (not shown this FIG.) and electrically coupled or connected through first power inverter 230 and second power inverter 250. Energy storage device 240 is typically connected in parallel with first power inverter 230 and second power inverter 250. Energy storage device 240 is any suitable type of energy storage device known to those skilled in the art such as one or more battery packs and/or ultra-capacitors.

First AC induction motor 210 is typically connected to an internal combustion engine prime mover (not shown this FIG.). In operation, first AC induction motor 210 acts as a generator, transforming the mechanical energy received at its input shaft, which is physically coupled to the ICE, into AC electrical energy. First power inverter 230 is electrically connected to the output of first AC induction motor 210 and operates as a boost rectifier. This allows first power inverter 230 to transform the AC electrical energy into DC electrical energy that is then stored in energy storage device 240.

Second AC induction motor 220 comprises a plurality of internal windings. Additionally, second AC induction motor 220 is typically connected to the wheels of the hybrid vehicle (not shown this FIG.) containing EPTO system 200.

Second power inverter 250 is operated as an inverter, transforming DC power into AC power at a fixed frequency and voltage. The three-phase output of second power inverter 250 is filtered by power filter 280 and is then delivered to output terminals 291 through power distribution/protection mechanism 290. In this example, output terminals 295 provide, but are not limited to, 208V 60 Hz three-phase power and can be used to supply power for a three-phase balanced load or two unbalanced single-phase loads.

Power filter 280 is a series of inductors and capacitors that serve to filter and smooth the AC electrical power signal delivered by second power inverter 250. In this embodiment of the present invention, the internal windings of second AC inductor motor 220 are used as part of power filter 280. This obviates the need of the additional inductors shown in FIG. 1. Power distribution/protection mechanism 290 provides circuit protection features and also provides for the physical distribution of the AC electrical power to an external load. Although shown as discrete components, those skilled in the art will appreciate that power filter 280 and power distribution/protection mechanism 290 may be combined into a single device.

Inverter controller 260 is connected to first power inverter 230 by first inverter controller bus 235 and to second power inverter 250 by second inverter controller bus 255. Inverter controller 260 is connected to power filter 280 and power distribution/protection mechanism 290 via filter bus 265. Inverter controller 260 is used to control the operation of first power inverter 230 and second power inverter 250 during EPTO operation. Additionally, inverter controller 260 accepts feedback from power filter 280 and power distribution/protection mechanism 290 relative to voltage and operational conditions. Finally, inverter controller 260 also communicates with the vehicle/transmission controller via bus 295 to coordinate total system management, including ICE speed control and fault handling functions.

Figure 3:
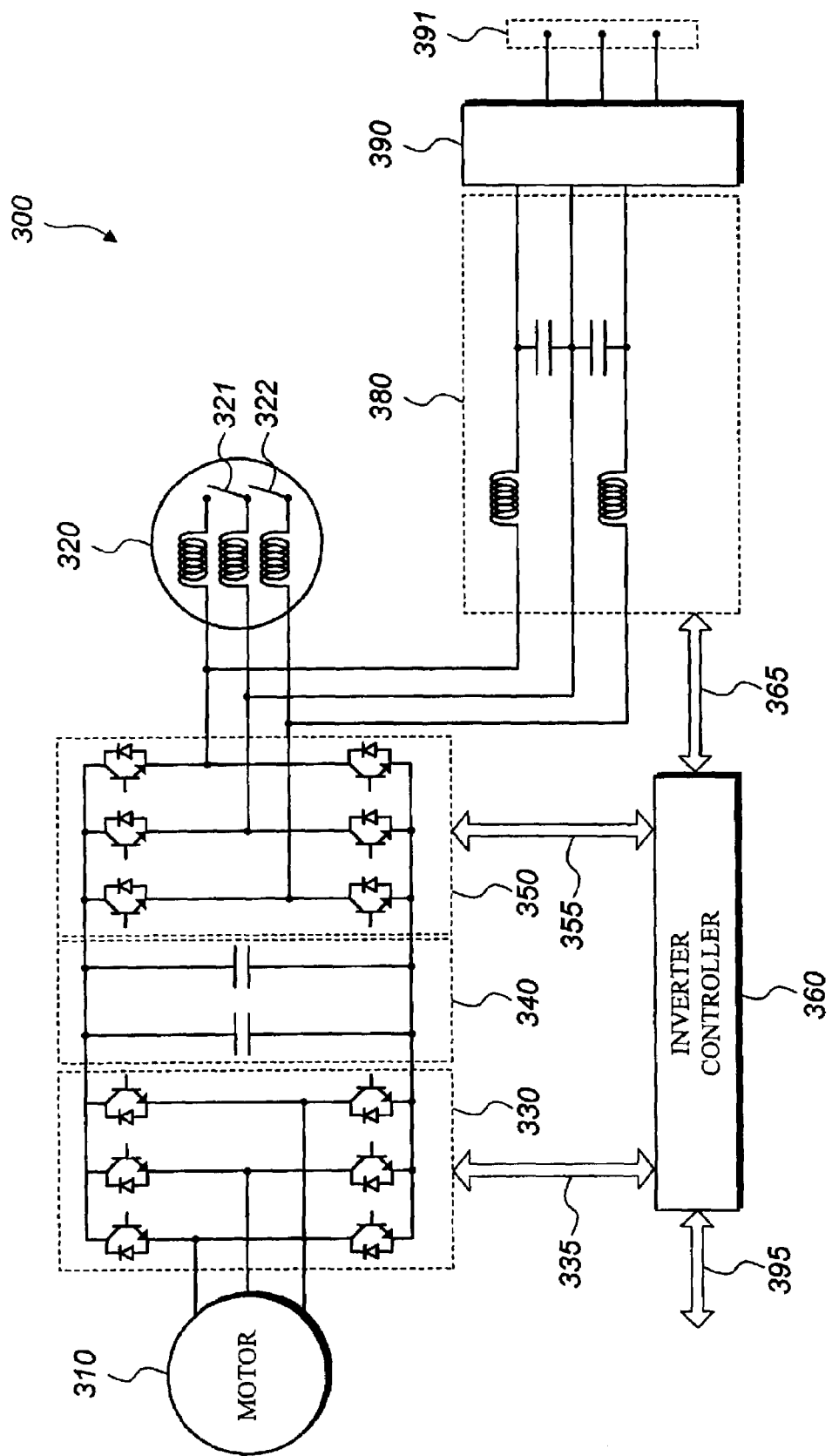
FIG. 3 is a schematic circuit diagram depicting an EPTO system for single-phase unbalanced loads in accordance with a preferred exemplary embodiment of the present invention.

Referring now to FIG. 3, an EPTO system 300 for powering single-phase unbalanced loads in accordance with a preferred exemplary embodiment of the present invention comprises: a first AC induction motor 310; a second AC induction motor 320; a first power inverter 330; a second power inverter 350; an energy storage device 340; an inverter controller 360; a power filter 380; and a power distribution/protection mechanism 390. Vehicle/transmission control bus 395, first inverter controller bus 335, second inverter controller bus 355, and filter bus 365 provide communication paths between the various components. Additionally, output terminals 391 are distribution points for the power output from EPTO system 300.

First AC induction motor 310 and second AC induction motor 320 are mechanically inter-connected through a complex planetary gear set (not shown this FIG.) and electrically coupled or connected through first power inverter 330 and second power inverter 350. Energy storage device 340 is typically connected in parallel with first power inverter 330 and second power inverter 350. Energy storage device 340 is any suitable type of energy storage device known to those skilled in the art such as one or more battery packs and/or ultra-capacitors.

First AC induction motor 310 is typically connected to an internal combustion engine prime mover (not shown this FIG.). In operation, first AC induction motor 310 acts as a generator, transforming the mechanical energy received at its input shaft, which is physically coupled to the ICE, into AC electrical energy. First power inverter 330 is electrically connected to the output of first AC induction motor 310 and operates as a boost rectifier. This allows first power inverter 330 to transform the AC electrical energy into DC electrical energy that is then stored in energy storage device 340.

Second AC induction motor 320 comprises a plurality of internal windings that are interconnected by switches 321 and 322. Switches 321 and 322 are typically located on the input terminals or the neutral connection, as shown in FIG. 3. Additionally, second AC induction motor 320 is typically connected to the wheels of the hybrid vehicle (not shown this FIG.) containing EPTO system 300. Since second AC induction motor 320 is not needed for operation of EPTO system 300, it is disconnected by opening switches 321 and 322.

Second power inverter 350 is operated as an inverter, transforming DC power into AC power at a fixed frequency and voltage. The output of second power inverter 350 is filtered by power filter 380 and is then delivered to output terminals 391 through power distribution/protection mechanism 390. In this example, output terminals 395 provide 120/240V 60 Hz single-phase power and can be used to supply power for single-phase unbalanced loads.

Power filter 380 is a series of inductors and capacitors that serve to filter and smooth the AC electrical power signal delivered by second power inverter 350. Power distribution/protection mechanism 390 provides circuit protection features and also provides for the physical distribution of the AC electrical power to an external load. Although shown as discrete components, those skilled in the art will appreciate that power filter 380 and power distribution/protection mechanism 390 may be combined into a single device.

Inverter controller 360 is connected to first power inverter 330 by first inverter controller bus 335 and to second power inverter 350 by second inverter controller bus 355. Inverter controller 360 is connected to power filter 380 and power distribution/protection mechanism 390 via filter bus 365. Inverter controller 360 is used to control the operation of first power inverter 330 and second power inverter 350 during EPTO operation. Additionally, inverter controller 360 accepts feedback from power filter 380 and power distribution/protection mechanism 390 relative to voltage and operational conditions. Finally, inverter controller 360 also communicates with the vehicle/transmission controller via bus 395 to coordinate total system management, including ICE speed control and fault handling functions.

Figure 4:
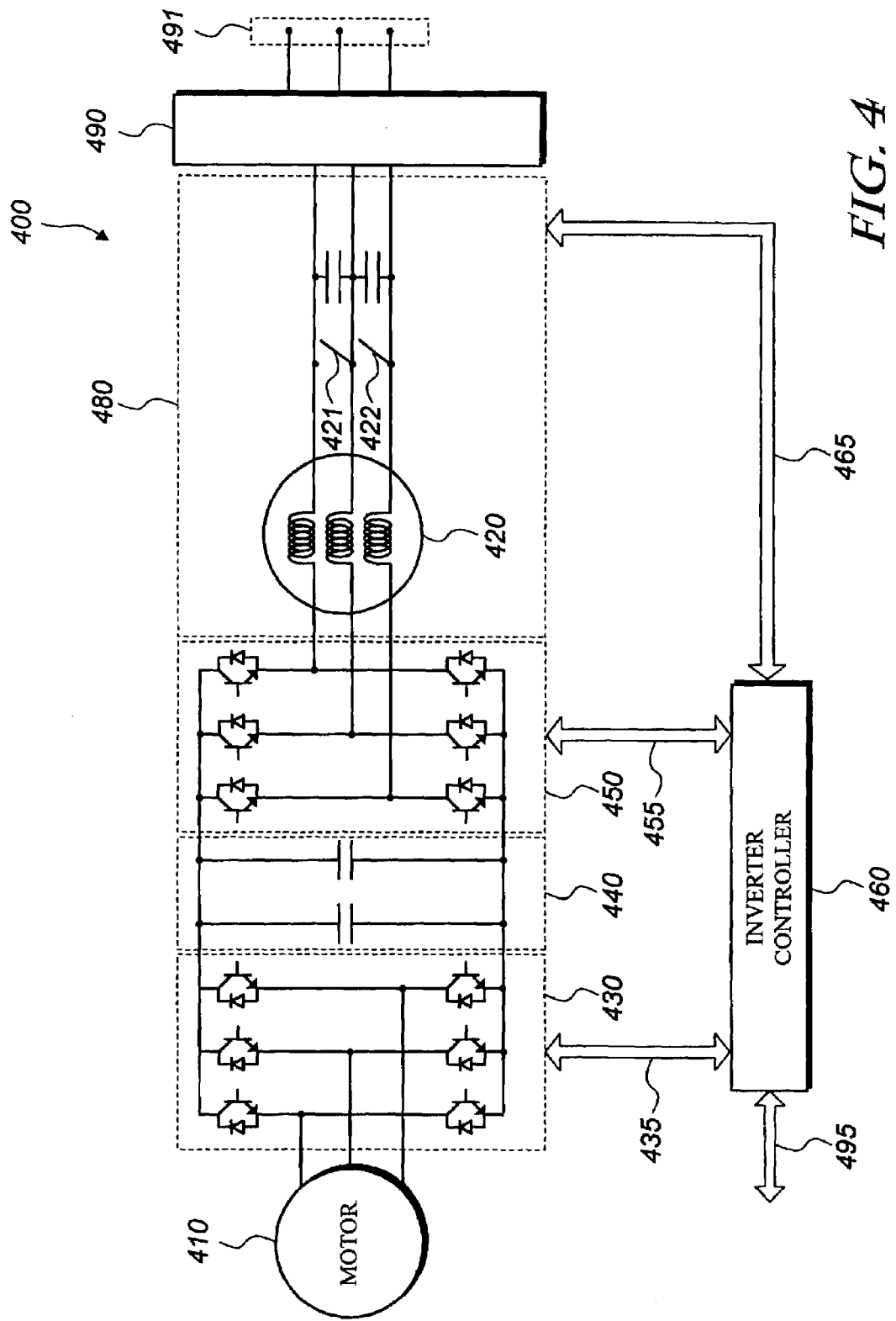
FIG. 4 is a schematic circuit diagram depicting an EPTO system for single-phase unbalanced loads in accordance with an alternative preferred exemplary embodiment of the present invention.

Referring now to FIG. 4, an EPTO system 400 for powering single-phase unbalanced loads in accordance with an alternative preferred exemplary embodiment of the present invention comprises: a first AC induction motor 410; a second AC induction motor 420; a first power inverter 430; a second power inverter 450; an energy storage device 440; an inverter controller 460; a power filter 480; and a power distribution/protection mechanism 490. Vehicle/transmission control bus 495, first inverter controller bus 435, second inverter controller bus 455, and filter bus 465 provide communication paths between the various components. Additionally, output terminals 491 are distribution points for the power output from EPTO system 400.

First AC induction motor 410 and second AC induction motor 420 are mechanically inter-connected through a complex planetary gear set (not shown this FIG.) and electrically coupled or connected through first power inverter 430 and second power inverter 450. Energy storage device 440 is typically connected in parallel with first power inverter 430 and second power inverter 450. Energy storage device 440 is any suitable type of energy storage device known to those skilled in the art such as one or more battery packs and/or ultra-capacitors.

First AC induction motor 410 is typically connected to an internal combustion engine prime mover (not shown this FIG.). In operation, first AC induction motor 410 acts as a generator, transforming the mechanical energy received at its input shaft, which is physically coupled to the ICE, into AC electrical energy. First power inverter 430 is electrically connected to the output of first AC induction motor 410 and operates as a boost rectifier. This allows first power inverter 430 to transform the AC electrical energy into DC electrical energy that is then stored in energy storage device 440.

Second AC induction motor 420 comprises a plurality of internal windings. Additionally, second AC induction motor 420 is typically connected to the wheels of the hybrid vehicle (not shown this FIG.) containing EPTO system 400.

Second power inverter 450 is operated as an inverter, transforming DC power into AC power at a fixed frequency and voltage. The output of second power inverter 450 is filtered by power filter 480 and is then delivered to output terminals 491 through power distribution/protection mechanism 490. In this example, output terminals 495 provide, but are not limited to, 120/240V 60 Hz supply power for unbalanced single-phase loads.

Power filter 480 is a series of inductors and capacitors that serve to filter and smooth the AC electrical power signal delivered by second power inverter 450. In this embodiment of the present invention, the internal windings of second AC inductor motor 420 are used as part of power filter 480. This obviates the need of the additional inductors shown in FIG. 3. Power distribution/protection mechanism 490 provides circuit protection features and also provides for the physical distribution of the AC electrical power to an external load. Although shown as discrete components, those skilled in the art will appreciate that power filter 480 and power distribution/protection mechanism 490 may be combined into a single device.

Inverter controller 460 is connected to first power inverter 430 by first inverter controller bus 435 and to second power inverter 450 by second inverter controller bus 455. Inverter controller 460 is connected to power filter 480 and power distribution/protection mechanism 490 via filter bus 465. Inverter controller 460 is used to control the operation of first power inverter 430 and second power inverter 450 during EPTO operation. Additionally, inverter controller 460 accepts feedback from power filter 480 and power distribution/protection mechanism 490 relative to voltage and operational conditions. Finally, inverter controller 460 also communicates with the vehicle/transmission controller via bus 495 to coordinate total system management, including ICE speed control and fault handling functions.

Figure 5:
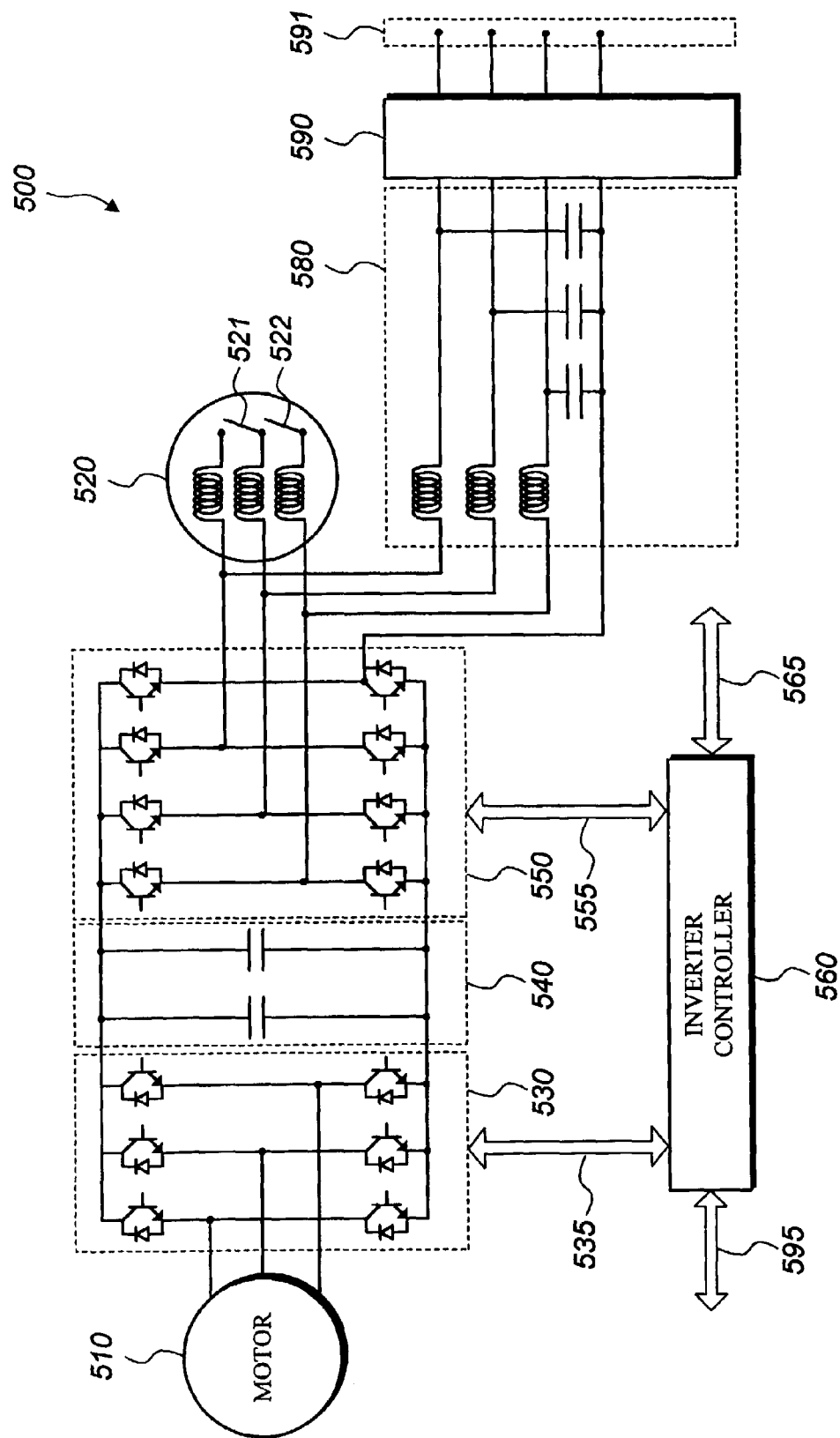
FIG. 5 is a schematic circuit diagram depicting an EPTO system for three-phase unbalanced loads in accordance with a preferred exemplary embodiment of the present invention.

Referring now to FIG. 5, an EPTO system 500 for powering three-phase unbalanced loads in accordance with a preferred exemplary embodiment of the present invention comprises: a first AC induction motor 510; a second AC induction motor 520; a first power inverter 530; a second power inverter 550; an energy storage device 540; an inverter controller 560; a power filter 580; and a power distribution/protection mechanism 590. Vehicle/transmission control bus 595, first inverter controller bus 535, second inverter controller bus 555, and filter bus 565 provide communication paths between the various components. Additionally, output terminals 591 are distribution points for the power output from EPTO system 500.

First AC induction motor 510 and second AC induction motor 520 are mechanically inter-connected through a complex planetary gear set (not shown this FIG.) and electrically coupled or connected through first power inverter 530 and second power inverter 550. Energy storage device 540 is typically connected in parallel with first power inverter 530 and second power inverter 550. Energy storage device 540 is any suitable type of energy storage device known to those skilled in the art such as one or more battery packs and/or ultra-capacitors.

First AC induction motor 510 is typically connected to an internal combustion engine prime mover (not shown this FIG.). In operation, first AC induction motor 510 acts as a generator, transforming the mechanical energy received at its input shaft, which is physically coupled to the ICE, into AC electrical energy. First power inverter 530 is electrically connected to the output of first AC induction motor 510 and operates as a boost rectifier. This allows first power inverter 530 to transform the AC electrical energy into DC electrical energy that is then stored in energy storage device 540.

Second AC induction motor 520 comprises a plurality of internal windings that are interconnected by switches 521 and 522. Switches 521 and 522 are typically located on the input terminals or the neutral connection, as shown in FIG. 5. Additionally, second AC induction motor 520 is typically connected to the wheels of the hybrid vehicle (not shown this FIG.) containing EPTO system 500. Since second AC induction motor 520 is not needed for operation of EPTO system 500, it is disconnected by opening switches 521 and 522.

Second power inverter 550 is operated as an inverter, transforming DC power into AC power at a fixed frequency and voltage. In this embodiment of the present invention, a four-legged inverter is used to control the non-zero neutral current of the unbalanced load. During standard vehicle operation, EPTO system 500 is not used and, accordingly, the fourth leg of the inverter is disabled. Whenever EPTO system 500 is activated to deliver AC power to output terminals 591, the fourth leg of second power inverter 550 is activated. The output of second power inverter 550 is filtered by power filter 580 and is then delivered to output terminals 591 through power distribution/protection mechanism 590. In this example, output terminals 595 provide, but are not limited to, 120/208V 60 Hz power for three-phase unbalanced loads.

Power filter 580 is a series of inductors and capacitors that serve to filter and smooth the AC electrical power signal delivered by second power inverter 550. Power distribution/protection mechanism 590 provides circuit protection features and also provides for the physical distribution of the AC electrical power to an external load. Although shown as discrete components, those skilled in the art will appreciate that power filter 580 and power distribution/protection mechanism 590 may be combined into a single device.

Inverter controller 560 is connected to first power inverter 530 by first inverter controller bus 535 and to second power inverter 550 by second inverter controller bus 555. Inverter controller 560 is connected to power filter 580 and power distribution/protection mechanism 590 via filter bus 565. Inverter controller 560 is used to control the operation of first power inverter 530 and second power inverter 550 during EPTO operation. Additionally, inverter controller 560 accepts feedback from power filter 580 and power distribution/protection mechanism 590 relative to voltage and operational conditions. Finally, inverter controller 560 also communicates with the vehicle/transmission controller via bus 595 to coordinate total system management, including ICE speed control and fault handling functions.

Figure 6:
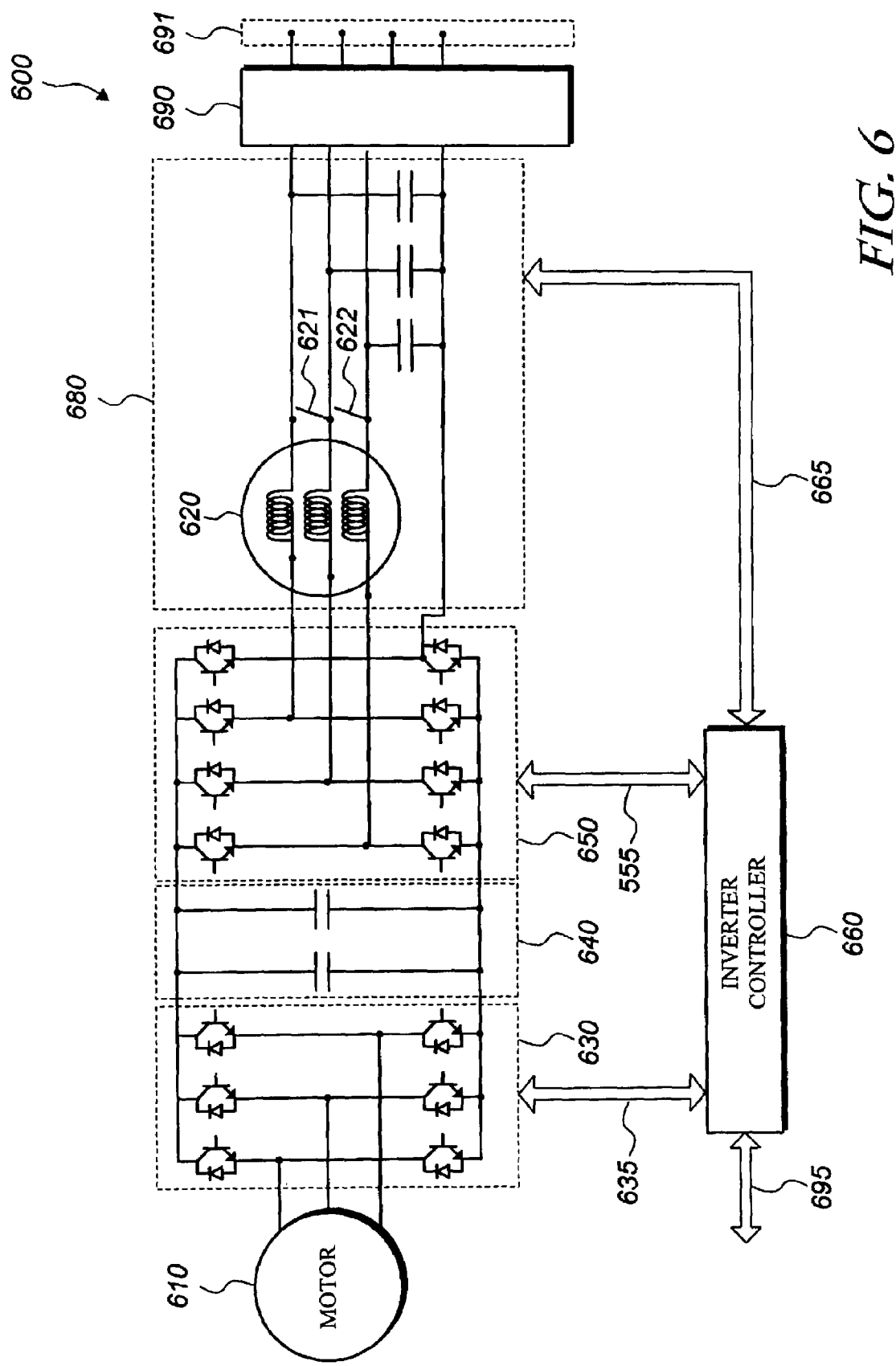
FIG. 6 is a schematic circuit diagram depicting an EPTO system for three-phase unbalanced loads in accordance with an alternative preferred exemplary embodiment of the present invention.

Referring now to FIG. 6, an EPTO system 600 for powering three-phase unbalanced loads in accordance with an alternative preferred exemplary embodiment of the present invention comprises: a first AC induction motor 610; a second AC induction motor 620; a first power inverter 630; a second power inverter 650; an energy storage device 640; an inverter controller 660; a power filter 680; and a power distribution/protection mechanism 690. Vehicle/transmission control bus 695, first inverter controller bus 635, second inverter controller bus 655, and filter bus 665 provide communication paths between the various components. Additionally, output terminals 691 are distribution points for the power output from EPTO system 600.

First AC induction motor 610 and second AC induction motor 620 are mechanically inter-connected through a complex planetary gear set (not shown this FIG.) and electrically coupled or connected through first power inverter 630 and second power inverter 650. Energy storage device 640 is typically connected in parallel with first power inverter 630 and second power inverter 650. Energy storage device 640 is any suitable type of energy storage device known to those skilled in the art such as one or more battery packs and/or ultra-capacitors.

First AC induction motor 610 is typically connected to an internal combustion engine prime mover (not shown this FIG.). In operation, first AC induction motor 610 acts as a generator, transforming the mechanical energy received at its input shaft, which is physically coupled to the ICE, into AC electrical energy. First power inverter 630 is electrically connected to the output of first AC induction motor 610 and operates as a boost rectifier. This allows first power inverter 630 to transform the AC electrical energy into DC electrical energy that is then stored in energy storage device 640.

Second AC induction motor 620 comprises a plurality of internal windings. Additionally, second AC induction motor 620 is typically connected to the wheels of the hybrid vehicle (not shown this FIG.) containing EPTO system 600.

Second power inverter 650 is operated as an inverter, transforming DC power into AC power at a fixed frequency and voltage. In this embodiment of the present invention, a four-legged inverter is used to control the non-zero neutral current of the unbalanced load. During standard vehicle operation, EPTO system 600 is not used and, accordingly, the fourth leg of the inverter is disabled. Whenever EPTO system 600 is activated to deliver AC power to output terminals 691, the fourth leg of second power inverter 650 is activated. The output of second power inverter 650 is filtered by power filter 680 and is then delivered to output terminals 691 through power distribution/protection mechanism 690. In this example, output terminals 695 provide, but are not limited to, 120/208V 60 Hz supply power for unbalanced three-phase loads.

Power filter 680 is a series of inductors and capacitors that serve to filter and smooth the AC electrical power signal delivered by second power inverter 650. In this embodiment of the present invention, the internal windings of second AC inductor motor 620 are used as part of power filter 680. This obviates the need of the additional inductors shown in FIG. 5. Power distribution/protection mechanism 690 provides circuit protection features and also provides for the physical distribution of the AC electrical power to an external load. Although shown as discrete components, those skilled in the art will appreciate that power filter 680 and power distribution/protection mechanism 690 may be combined into a single device.

Inverter controller 660 is connected to first power inverter 630 by first inverter controller bus 635 and to second power inverter 650 by second inverter controller bus 655. Inverter controller 660 is connected to power filter 680 and power distribution/protection mechanism 690 via filter bus 665. Inverter controller 660 is used to control the operation of first power inverter 630 and second power inverter 650 during EPTO operation. Additionally, inverter controller 660 accepts feedback from power filter 680 and power distribution/protection mechanism 690 relative to voltage and operational conditions. Finally, inverter controller 660 also communicates with the vehicle/transmission controller via bus 695 to coordinate total system management, including ICE speed control and fault handling functions.

From the foregoing description, it should be appreciated that the methods described herein provide for a much-improved EPTO system for hybrid vehicles. While various preferred exemplary embodiments have been presented in the foregoing detailed description of the preferred exemplary embodiments, it should be appreciated that a vast number of variations in the embodiments exist. It should also be appreciated that the preferred exemplary embodiments are only examples, and are not intended to limit the scope, applicability, or configuration of the invention in any way. Rather, the foregoing detailed description provides those skilled in the art with a convenient road map for implementing one or more preferred exemplary embodiments of the invention. It should also be understood that various changes may be made in the function and arrangement of elements described in the exemplary preferred embodiments without departing from the spirit and scope of the invention as set forth in the appended claims.

The invention claim is:

1. An electric power take-off system comprising:
   a first electrical machine;
   a first inverter coupled to said first electrical machine;
   a second inverter coupled to said first inverter;
   a second electrical machine coupled to said second inverter, said second electrical machine comprising:
      a first internal switch;
      a second internal switch;
      a first internal winding having a first end coupled to said second inverter;
      a second internal winding having a second end coupled to said second inverter; and
      a third internal winding having a third end coupled to said second inverter, wherein said first internal winding and said second internal winding are selectively connected or disconnected by said first internal switch and wherein said second internal winding and said third internal winding are selectively connected or disconnected by said second internal switch;
   an energy storage device coupled to said first inverter and said second inverter;
   an inverter controller coupled to and controlling said first inverter and said second inverter;
   a power filter coupled to said second inverter and to said first and second end, and said third end, said power filter comprising:
      a plurality of inductors coupled to said second inverter; and
      a plurality of capacitors coupled to said plurality of inductors; and
   a power distribution mechanism coupled to said power filter.

2. The apparatus of claim 1 wherein said first electrical machine and said first inverter and said second inverter and said second electrical machine and said energy storage device and said inverter controller comprise a transmission for a hybrid vehicle.

3. The apparatus of claim 1 wherein said second electrical machine comprises an AC induction motor.

4. The apparatus of claim 1 wherein said energy storage device comprises a battery pack.

5. The apparatus of claim 1 further comprising a prime mover coupled to said first electrical machine.

6. The apparatus of claim 1 further comprising an external load coupled to said power distribution mechanism.

7. The apparatus of claim 6 wherein said external load comprises a single-phase load.

8. The apparatus of claim 6 wherein said external load comprises a three-phase balanced load.

9. The apparatus of claim 6 wherein said second inverter comprises a four-legged inverter and said external load comprises a three-phase unbalanced load.

10. An electric power take-off system comprising:
    a generator configured to transform mechanical energy from an internal combustion engine into AC electrical energy;

a first power inverter coupled said generator, said first power inverter being configured to transform AC electrical energy from said generator into DC electrical energy;

an energy storage device coupled to said first power inverter, said energy storage device being configured to store DC electrical energy from said first power inverter;

a second power inverter coupled to said first power inverter and to said energy storage device, said second power inverter being configured to transform DC electrical energy from said energy storage device into AC electrical energy;

an AC induction motor configured to transform DC electrical energy into AC electrical energy, said AC induction motor comprising a plurality of windings, each having a respective common end coupled to an internal switch arrangement, and each having a respective output end coupled to said second power inverter, said internal switch arrangement being controllable to disconnect said AC induction motor for an electric power take-off mode.

11. An electric power take-off system comprising:

a first electrical machine;

a first inverter coupled to said first electrical machine;

a second inverter coupled to said first inverter, said second inverter having output nodes;

a second electrical machine coupled to said second inverter, said second electrical machine comprising:
  a plurality of windings, each having a common end and an output end, said output ends being coupled to said output nodes of said second inverter; and
  an internal switch arrangement coupled to said common ends of said plurality of windings, said internal switch arrangement being configured to disconnect said common ends from each other for an electric power take-off mode;

an energy storage device coupled to said first inverter and said second inverter; and a power filter coupled to said output nodes of said second inverter, and to said output ends of said plurality of windings.

* * * * *